US006763462B1

(12) United States Patent
Marsh

(10) Patent No.: US 6,763,462 B1
(45) Date of Patent: Jul. 13, 2004

(54) E-MAIL VIRUS DETECTION UTILITY

(75) Inventor: David Marsh, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/412,702

(22) Filed: Oct. 5, 1999

(51) Int. Cl.[7] .................. G06F 11/30; G06F 12/14; H04L 9/32
(52) U.S. Cl. .................. 713/188; 713/201; 709/206
(58) Field of Search ................. 713/188, 201, 713/200; 709/206

(56) References Cited

U.S. PATENT DOCUMENTS 5,761,415 A * 6/1998 Joseph et al. ............ 709/206
5,832,208 A * 11/1998 Chen et al. ............. 713/201
2001/0044828 A1 * 11/2001 Kikinis .................. 709/206

* cited by examiner

Primary Examiner—Gilberto Barron
Assistant Examiner—Cas Stulberger
(74) Attorney, Agent, or Firm—Trop, Pruner & Hu, P.C.

(57) ABSTRACT

A method to detect a computer virus may be utilized by a virus detection routine which monitors electronic messages transmitted by an electronic mail (e-mail) application. Random numbers may be generated and associated with specific e-mail addresses in a distribution list or electronic address book. Each time the e-mail application transmits an electronic message, the virus routine may be invoked to inspect recipient addresses of the outgoing message. If the e-mail addresses corresponding to the random numbers match one or more of the recipient addresses, the virus routine may alert a user of potential virus activity.

32 Claims, 2 Drawing Sheets

E-MAIL VIRUS DETECTION UTILITY

BACKGROUND

The invention relates generally to computer viruses, and more particularly to a technique to detect computer viruses that replicate through electronic mail.

As computer systems and networks have become an integral part of today's world, some individuals have developed computer viruses which may hinder the operation of computers. Whether a virus is intended simply as a practical joke or a planned attack on a computer network, vast amounts of damage may result. A computer virus is a program that disrupts operations of a computer by modifying (infecting) other executable programs. A virus may also delete or corrupt crucial system files, user data files or application programs. Additionally, computer viruses may make copies of themselves to distribute to other computers connected to a communications network, thereby causing damage to computers at several locations. Computer viruses are usually designed to be hidden from a computer user by being stored at an unusual location on a hard disk, for example.

One way in which computer viruses may be spread is through electronic mail, or e-mail, as it is commonly called. An electronic mail system provides a way for computer users to communicate by sending e-mail messages over a communications network such as a local area network, wide area network, or the Internet. A recent wave of viruses have utilized e-mail technology to spread very quickly and infect computers in various geographic locations. For example, a virus may attempt to send a copy of itself to other computers by sending e-mail messages including destructive code segments.

Various software applications are available which attempt to detect and remove viruses located on a particular computer. These anti-virus applications generally scan computer storage devices searching for bit patterns or code patterns that are commonly used in viruses. Some programs, called integrity checkers, attempt to determine when other executable programs on a computer have been modified. Another technique that may be employed to detect viruses tracks the behavior of executable programs on a computer system. If a program exhibits behavior that is either inconsistent with typical programs or consistent with viruses, the program is flagged. Once suspicious programs have been identified, code segments within the programs may be analyzed to determine if they are performing destructive operations. Conventional anti-virus applications have not been successful in eliminating all of the viruses that spread by sending electronic mail. Thus, it would be beneficial to combat computer viruses that replicate via e-mail messages.

SUMMARY

In one embodiment, the invention provides a method to detect a computer virus. The method includes identifying one or more electronic mail addresses and examining an outgoing electronic mail message to determine if the identified electronic mail addresses corresponds to a recipient of the electronic mail message. In addition, the method may include generating an alert if all or a specified number of the identified electronic mail addresses corresponds to recipients of the outgoing electronic mail message. Alternatively, the method may be embodied in instructions stored on a program storage device that is readable by a programmable control device. In another embodiment, the programmable storage device which includes instructions of the method may be included in a computer system having an electronic mail application.

DETAILED DESCRIPTION

Figure 1:
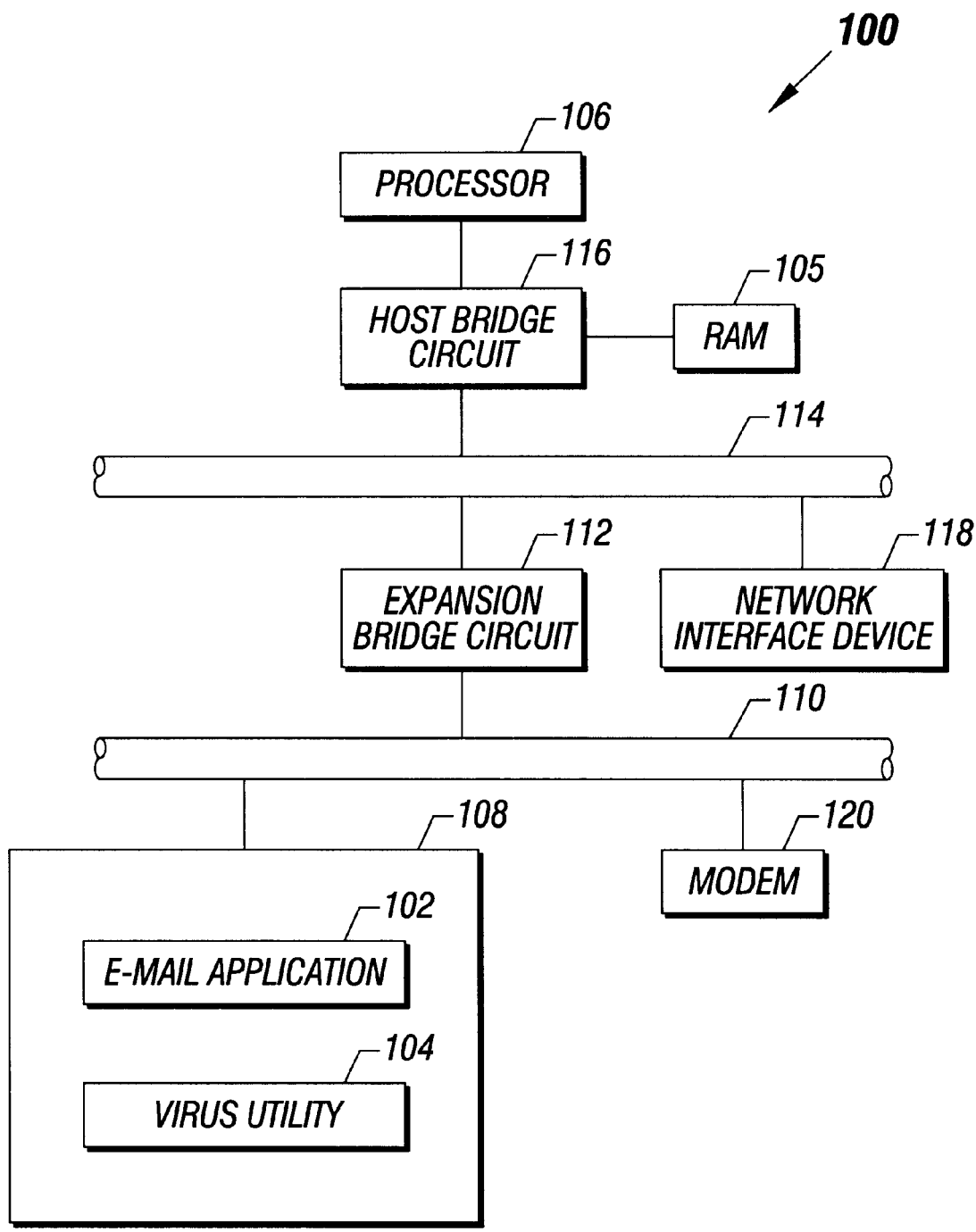
FIG. 1 shows an illustrative computer system including a virus detection utility to detect computer viruses in accordance with one embodiment of the invention.

Referring to FIG. 1, an illustrative computer system 100 may include an electronic mail (e-mail) application 102 for sending and receiving e-mail messages and a virus detection utility 104 to detect computer viruses by examining e-mail distribution patterns. In particular, the virus detection utility 104 may detect viruses that replicate by sending electronic messages that include a copy of destructive code segments. The e-mail application 102 may be any computer program capable of generating and sending electronic messages such as Exchange or OUTLOOK® by Microsoft Corporation of Redmond, Washington. Each time the e-mail application 102 transmits an electronic message, the virus detection utility 104 may be automatically executed to examine e-mail distribution patterns.

In one embodiment, the virus detection utility 104 may be an add in program organized into a conventional format such as a plug-in for the e-mail application 102. A plug-in is a supplementary program that provides additional functionality to another program. For example, the virus detection utility 104 may be stored as a dynamic link library (DLL) file and may include routines to execute in conjunction with the e-mail application 102 to perform specific operations.

Each time the e-mail application 102 is launched, a set of random numbers may be generated by any conventional random number algorithm. This set of numbers may be stored as program variables in a segment of random access memory (RAM) 105 that is being used to store data for the virus detection utility 104. In one embodiment, five (5) random numbers (integers) may be generated and then associated with one of five specific e-mail addresses to which the e-mail application 102 may send electronic messages. Each number may be associated with a specific e-mail address in any appropriate manner. For example, each number may represent a position in a list of e-mail addresses in a distribution list or address book. By selecting a distribution list, a user may send an electronic message to each e-mail address in the list without having to manually enter each individual's address. Additionally, an address book may be a list of e-mail addresses to which a user frequently sends messages. The random numbers generated may be constrained by the total number of e-mail addresses in either a distribution list or an address book. In addition, fewer random numbers may be generated if there are only a small number of e-mail addresses in a distribution list or address book. For example, if an address book includes only four (4) e-mail addresses, the virus detection utility 104 may only generate one (1) random number. In one embodiment of the invention, the virus detection utility 104 may determine how many random numbers to generate based on a ratio of random numbers to e-mail addresses (e.g., 1:10). However, if a distribution list or address book does not include any e-mail addresses, the virus detection utility 104 may be disabled. Alternatively, a subset of e-mail addresses may be selected randomly from a distribution list or address book to detect potential virus activity, rather than generating random numbers.

In accordance with another embodiment of the invention, the generated random numbers may also be utilized as a security code to prevent a computer virus or other unauthorized programs from disabling the virus detection utility 104. A security code may be formed by combining the digits of the random numbers or by applying a function to the random numbers. Another program must first be authenticated by submitting the security code before any attempts may be made to access or modify the virus detection utility 104.

Figure 2:
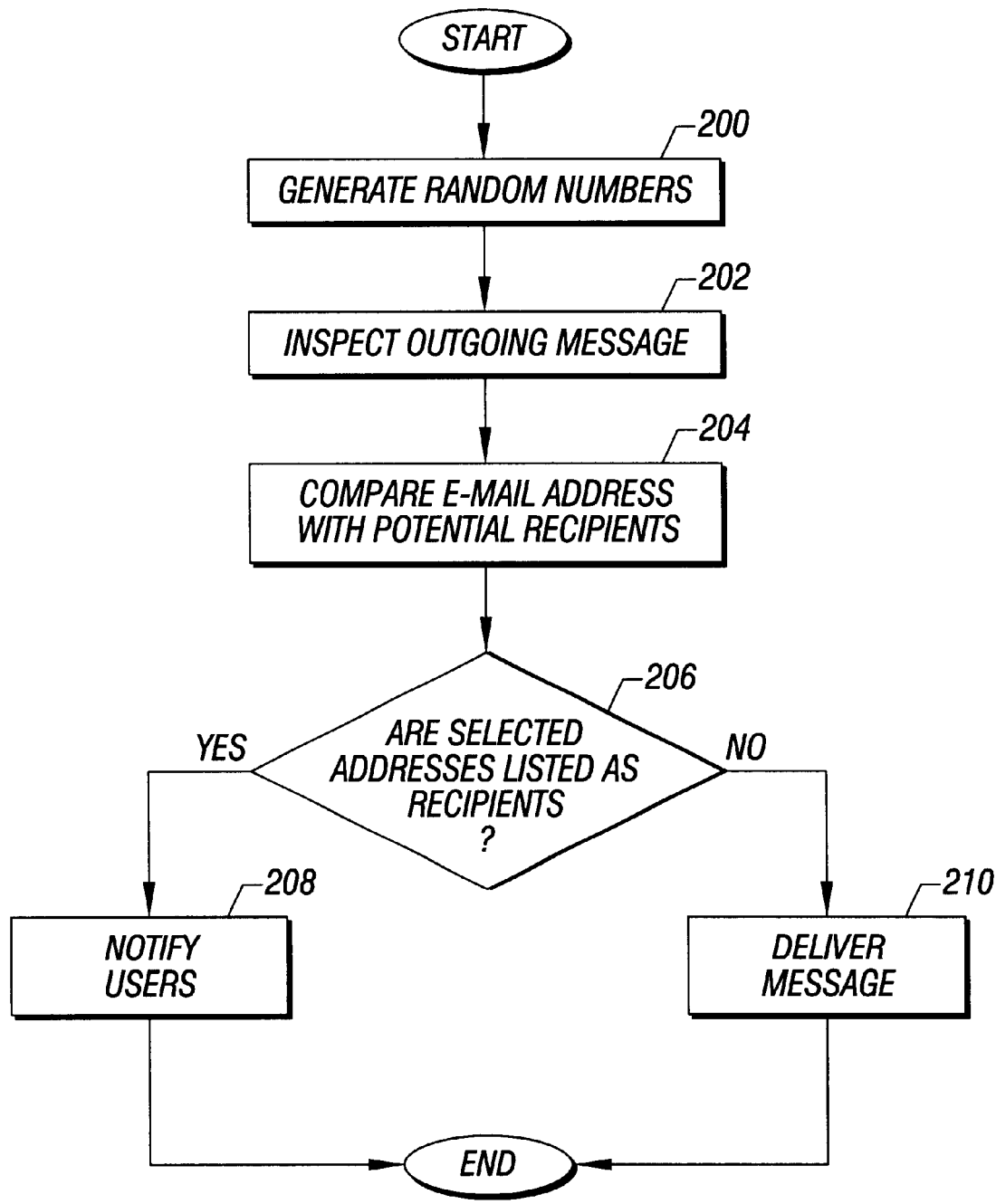
FIG. 2 shows a flow diagram for a virus detection utility in accordance with another embodiment of the invention.

Referring to FIG. 2, the random numbers may be generated when the email application 102 is launched, as shown in block 200. Each time an electronic message is transmitted, the virus detection utility 104 inspects the outgoing message to identify the message's intended recipients. The virus detection utility 104 may examine e-mail distribution patterns by comparing selected e-mail addresses corresponding to the random numbers with potential recipients of the outgoing e-mail message at block 204. If all of the selected e-mail addresses are listed as recipients of a pending electronic message at diamond 206, possible virus activity may be occurring and a user may be notified as shown in block 208. Otherwise, an outgoing electronic message may be delivered according to normal operations of the e-mail application 102 at block 210. In accordance with another embodiment, potential virus activity may be detected by finding a specified number of the e-mail addresses corresponding to the generated random numbers in the recipient list of an outgoing message. For example, a user may be alerted if three (3) of the five (5) e-mail addresses associated with the random numbers are listed as recipients. In this manner, viruses that attempt to spread to other computers rapidly by sending e-mail may be identified by monitoring patterns of e-mail distribution in a user's e-mail account.

A user may be notified of possible virus activity (block 208) through any conventional messaging technique such as a pop-up warning dialog. A virus warning may include information regarding recent e-mail activity such as recipients and message content. The virus warning may also give a user options to respond to possible virus activity including deleting an outgoing message without sending, saving an outgoing message for later examination, or disregarding the warning and sending an outgoing message.

In yet another embodiment, the virus detection utility 104 may examine e-mail distribution patterns to determine if a computer virus is replicating itself by sending e-mail messages to individual e-mail addresses (i.e., one at a time). Some viruses may attempt to send a series of e-mail messages, each to a different e-mail address, in an effort to disguise a mass distribution of virus code segments. The random numbers generated may again represent positions of an e-mail addresses in a distribution list or address book. In this embodiment, the virus detection utility 104 may track e-mail messages sent by the e-mail application 102. If electronic messages are sent to each of the e-mail addresses represented by the random numbers in a specified period of time, a virus warning may be issued to a user. The user would again have the options described above regarding the disposition of an outgoing message. For example, if e-mail messages are transmitted to all recipients identified by the random numbers within two minutes, a user may be alerted. Alternatively, potential virus activity may be identified if electronic messages are transmitted to a particular number of the selected e-mail addresses (e.g., 3 out of 5) within the specified period of time, e.g. two minutes.

Referring again to FIG. 1, the e-mail application 102 and the virus detection utility 104 may be located on one or more program storage devices 108 such as hard disk drives or optical disk drives. The program storage devices may be accessed by other system components through a secondary bus 110 which is coupled to an expansion bridge circuit 112, such as the 82371AB PIIX4 IDE controller from Intel Corporation. The secondary bus 110 may be operated in conformance with the Industry Standard Architecture (ISA), Extended Industry Standard Architecture (EISA), or the Low Pin Count (LPC) standards. A primary bus 114, coupled to the expansion bridge circuit 112, may facilitate communication between various devices and the processor 106 through a host bridge circuit 116, such as the 82443BX Host-to-PCI bridge device from Intel Corporation. One such device coupled to the processor may be a network interface device 118 which may serve as an interface between the system 100 and an external communications network such as a local area network (LAN) or wide area network (WAN). In one embodiment, the e-mail application 102 may send and receive e-mail messages via the network interface. In another embodiment, the e-mail application may transmit e-mail messages over a modem 120 that may be coupled to the secondary bus 110.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A method comprising:
   identifying one or more electronic mail addresses;
   examining an outgoing electronic mail message to determine if one or more of the identified electronic mail addresses correspond to recipients of the outgoing electronic mail message; and
   generating an alert message indicating potential detection of a computer virus in response to the examination of the outgoing electronic mail message.

2. The method of claim 1, wherein the act of identifying one or more electronic mail addresses comprises randomly identifying a specified number of electronic mail addresses in an electronic mail addresses list.

3. The method of claim 2, wherein the specified number comprises 5.

4. The method of claim 2, wherein the specified number comprises a specified percentage of the total number of electronic mail addresses in the electronic mail addresses list.

5. The method of claim 4, wherein the specified percentage comprises approximately 10-percent.

6. The method of claim 1, wherein the act of examining an outgoing electronic mail message comprises:
   identifying intended recipients of the outgoing electronic mail message;
   comparing said intended recipients with the identified electronic mail addresses; and
   recording an indication when there is a match between intended an intended recipient and an identified electronic mail address.

7. The method of claim 1, further comprising generating an alert message if all of the identified electronic mail addresses correspond to recipients of the outgoing electronic mail message.

8. The method of claim 1, further comprising generating an alert message if a specified number of the identified electronic mail addresses corresponds to recipients of the outgoing electronic mail message.

9. The method of claim 8, wherein the specified number comprises that number which is approximately 50-percent of the number of identified electronic mail addresses.

10. A program storage device, readable by a programmable control device, comprising instructions stored on the program storage device for causing the programmable control device to:

identify one or more electronic mail addresses;

examine an outgoing electronic mail message to determine if one or more of the identified electronic mail addresses correspond to recipients of the outgoing electronic mail message; and generate an alert message indicating detection of a potential computer virus in response to the examination of the outgoing electronic mail message.

11. The program storage device of claim 10, wherein the instructions to identify one or more electronic mail addresses comprise instructions to randomly identify a specified number of electronic mail addresses in an electronic mail addresses list.

12. The program storage device of claim 10, wherein the specified number comprises 5.

13. The program storage device of claim 11, wherein the specified number comprises a specified percentage of the total number of electronic mail addresses in the electronic mail addresses list.

14. The program storage device of claim 13, wherein the specified percentage comprises approximately 10-percent.

15. The program storage device of claim 10, wherein the instructions to examine an outgoing electronic mail message comprise instructions to:

identify intended recipients of the outgoing electronic mail message;

compare said intended recipients with the identified electronic mail addresses; and record an indication when there is a match between an intended recipient and an identified electronic mail address.

16. The program storage device of claim 10, further comprising instructions to generate an alert message if all of the identified electronic mail addresses correspond to recipients of the outgoing electronic mail message.

17. The method of claim 1, further comprising instructions to generate an alert message if a specified number of the identified electronic mail addresses corresponds to recipients of the outgoing electronic mail message.

18. The program storage device of claim 17, wherein the specified number comprises that number which is approximately 50-percent of the number of identified electronic mail addresses.

19. A computer system comprising:

a processor;

a program storage device coupled to the processor;

an electronic mail routine stored on the program storage device, the electronic mail routine adapted to send electronic mail messages; and a virus detection routine stored on the program storage device, the virus detection routine comprising instructions to identify one or more electronic mail addresses and examine an outgoing electronic mail message to determine if one or more of the identified electronic mail addresses correspond to recipients of the outgoing electronic mail message.

20. The computer system of claim 19, wherein the instructions to examine an outgoing electronic mail message comprise instructions to:

identify intended recipients of the outgoing electronic mail message;

compare said intended recipients with the identified electronic mail addresses; and record an indication when there is a match between an intended recipient and an identified electronic mail address.

21. A method comprising:

identifying addresses of an outgoing electronic mail message;

based on at least in part the identification of the addresses, automatically determining whether a potential virus is associated with the outgoing electronic mail message; and automatically taking an action in response to the automatic determination.

22. The method of claim 21, wherein the act of automatically taking the action comprises:

generating an alert message indicating detection of the potential virus.

23. The method of claim 21, wherein the act of automatically determining comprises:

comparing the addresses of the outgoing electronic mail message to a predetermined set of addresses to identify whether the outgoing electronic mail message is associated with a mass mailing.

24. The method of claim 21, wherein the act of automatically determining comprises:

comparing the addresses of the outgoing electronic mail message to a predefined set of addresses to identify whether the outgoing electronic mail message is one of a set of electronic mail messages of a mass mailing.

25. An article comprising a computer readable storage medium storing instructions to cause a processor-based system to:

identify addresses of an outgoing electronic mail message;

based on at least in part the identification of the addresses, determine whether a potential virus is associated with the outgoing electronic mail message; and take an action in response to the determination.

26. The article of claim 25, the storage medium storing instructions to cause the processor-based system to generate an alert message indicating detection of the potential virus in response the determination.

27. The article of claim 25, the storage medium storing instructions to cause the processor-based system to compare the addresses of the outgoing electronic mail message to a predetermined set of addresses to identify whether the outgoing electronic mail message is associated with a mass mailing.

28. The article of claim 25, the storage medium storing instructions to cause the processor-based system to compare the addresses of the outgoing electronic mail message to a predefined set of addresses to identify whether the outgoing electronic mail message is one of a set of electronic mail messages of a mass mailing.

29. A computer system comprising:

an interface to communicate an outgoing electronic mail message;

a processor adapted to:

identify addresses of an outgoing electronic mail message, based on at least in part the identification of addresses, determine whether a potential virus is associated with the outgoing electronic mail message, and take an action in response to the determination.

30. The computer system of claim 29, wherein the processor is adapted to generate an alert message indicating detection of the potential virus.

31. The computer system of claim 29, wherein the processor is adapted to compare the addresses of the outgoing electronic mail message to a predetermined set of addresses to identify whether the outgoing electronic mail message is associated with a mass mailing.

32. The computer system of claim 29, wherein the processor is adapted to compare the addresses of the outgoing electronic mail message to a predefined set of addresses to identify whether the outgoing electronic mail message is one of a set of electronic mail messages of a mass mailing.

* * * * *